United States Patent [19]

Willard

[11] Patent Number: 4,981,628

[45] Date of Patent: Jan. 1, 1991

[54] REPAIRING REFRACTORY LININGS OF VESSELS USED TO SMELT OR REFINE COPPER OR NICKEL

[75] Inventor: David C. Willard, Freeport, The Bahamas

[73] Assignee: Sudamet, Ltd., The Bahamas

[21] Appl. No.: 309,612

[22] Filed: Feb. 10, 1989

Related U.S. Application Data

[63] Continuation-in-part of Ser. No. 255,634, Oct. 11, 1988.

[51] Int. Cl.[5] .......................... B05D 1/08; B32B 35/00; F27D 1/16

[52] U.S. Cl. .......................... 264/30; 264/36; 264/81; 266/281; 427/140; 427/423; 501/88

[58] Field of Search .......................... 264/30, 36, 80, 81; 427/423, 140; 501/88, 4, 9, 55, 67, 118, 121, 122, 132, 133, 128, 104, 154; 266/281

[56] References Cited

U.S. PATENT DOCUMENTS

| | | | |
|---|---|---|---|
| 1,934,263 | 11/1933 | Hacks et al. . | |
| 2,108,998 | 2/1938 | Schori . | |
| 2,741,822 | 4/1956 | Udy . | |
| 2,877,009 | 3/1959 | Doll | 266/281 |
| 2,904,449 | 9/1959 | Bradstreet . | |
| 2,943,951 | 7/1960 | Haglund . | |
| 3,396,961 | 8/1968 | Farrington | 264/30 X |
| 3,415,450 | 12/1968 | Hawk . | |
| 3,416,779 | 3/1969 | Campbell, Jr. . | |
| 3,458,077 | 7/1969 | Sullivan et al. | 264/30 |
| 3,533,375 | 10/1970 | McConnell . | |
| 3,551,098 | 9/1970 | Resch et al. | 264/30 |
| 3,563,523 | 2/1971 | Wendt, Jr. | 264/30 X |
| 3,684,560 | 8/1972 | Brichard et al. . | |
| 3,800,983 | 4/1974 | Brichard et al. . | |
| 3,833,334 | 9/1974 | Riley | 264/30 X |
| 3,880,967 | 4/1975 | Loggins et al. | 264/36 X |
| 4,023,781 | 5/1977 | Fritz et al. | 266/281 X |
| 4,093,755 | 6/1978 | Dahl et al. . | |
| 4,107,244 | 8/1978 | Ochiai et al. . | |
| 4,192,460 | 3/1980 | Matsu | 264/30 X |
| 4,248,809 | 2/1981 | Sakai et al. | 264/30 |
| 4,283,042 | 8/1981 | Kubo | 264/30 X |
| 4,385,749 | 5/1983 | van der Linden | 264/36 X |
| 4,411,935 | 10/1983 | Anderson . | |
| 4,416,999 | 11/1983 | Hiromi et al. . | |

(List continued on next page.)

FOREIGN PATENT DOCUMENTS

| | | |
|---|---|---|
| 903711 | 5/1986 | Belgium . |
| 956102 | 10/1974 | Canada . |
| 102083 | 5/1941 | Sweden . |
| 991046 | 5/1965 | United Kingdom . |
| 1151423 | 5/1969 | United Kingdom . |
| 1330894 | 9/1973 | United Kingdom . |
| 1330895 | 9/1973 | United Kingdom . |
| 2035524 | 6/1980 | United Kingdom . |

OTHER PUBLICATIONS

Metal Producing, vol. 33, Sep. 1982, pp. 32-33.

"Ultra-High Temperature Spraying to Coat Metals with Refractories", by P. W. Sherwood, Product Finishing, vol. 14, No. 11, pp. 98-100, Nov. 1961.

"Ultra-High Temperature Spraying-To Coat Metals with Refractories", by P. W. Sherwood Products Finishing, pp. 54-60, Feb. 1965.

"Flame Sprayed Coatings" by John A. Mack, Materials in Design Engineering, pp. 89-104, Feb. 1966.

"Ceramic Welding-A New Approach to the Production of Refractory Repair Masses," by C. Zvosec and J. Briggs, Iron and Steel Making (I&SM), pp. 43-46, Sep., 1988.

*Primary Examiner*—Jan H. Silbaugh

*Assistant Examiner*—Karen D. Kutach

*Attorney, Agent, or Firm*—Watts, Hoffman, Fisher & Heinke

[57] ABSTRACT

A method of increasing the life of tuyere area refractories through repeated application of coherent refractory mass formed by ceramic welding process onto worn area after installing protective removable, expendable or reuseable pipes/rods. Consecutive use of this process can effectively suspend or reduce or control the wear of the original refractories.

13 Claims, 1 Drawing Sheet

U.S. PATENT DOCUMENTS 4,427,785 1/1984 Prochazka et al. .
4,442,052 2/1984 Reynertson .......................... 264/30
4,465,648 8/1984 Kiriyama et al. ................ 264/36 X
4,487,397 12/1984 Autonov et al. ................ 264/30 X
4,489,022 12/1984 Robyn et al. .
4,497,473 2/1985 Robyn et al. .
4,503,093 3/1985 Iseli et al. .
4,542,889 9/1985 Robyn et al. .
4,546,902 10/1985 Anderson .
4,560,591 12/1985 Plumat et al. .
4,588,655 5/1986 Kushner .......................... 427/423 X
4,593,007 6/1986 Novinski ......................... 427/423 X
4,634,611 1/1987 Browning ........................... 427/423
4,678,120 7/1987 Matsuo .
4,792,468 12/1988 Robyn et al. .
4,818,574 4/1989 Mottet .
4,865,252 9/1989 Rotolico et al. .

REPAIRING REFRACTORY LININGS OF VESSELS USED TO SMELT OR REFINE COPPER OR NICKEL

RELATED APPLICATION

This application is a continuation-in-part of my co-pending application Ser. No. 07/255,634 filed Oct. 11, 1988, owned by the assignee of this application, the contents of which is hereby incorporated by reference.

BACKGROUND OF THE INVENTION

This invention relates to a method of adding to a refractory lined vessel in a working environment at temperatures over 800° F.

Vessels used to smelt or refine copper or nickel are lined with refractory linings capable of withstanding the temperatures and other wear forces such as thermal shock and/or mechanical erosion encountered in the smelting or refining process of the above metals.

Most common refractory linings used are linings with principal ingredients of Magnesite, Chrome and/or Alumina although Zirconia can also be used.

The principal vessels used in the refining of copper and/or nickel are known as convertors and Anode refining vessels. In addition, one type of vessel used in the smelting of metals is referred to in the industry as a reactor. These types of vessels all incorporate pipes through the refractory lining which are used to inject air and/or oxygen into the material being refined or smelted. Such pipes are commonly known as tuyeres.

The number of tuyeres varies widely depending on the particular use. For example, an anode refining vessel may have one to six tuyeres; a convertor may have 20 to 60 tuyeres and a reactor may have 40 to 80 tuyeres depending on the size of the vessel and the output capacity of the vessel.

The relatively cold gases are forced into the material being refined or smelted and react with the material to generate substantial heat. In addition, turbulence is created in this area by the pressure of adding the gases to the molten charge. Such charges are subjected to this blowing of gases into them through the tuyeres until they have reached the acceptable stage of refinement or smelting for the material They are then transferred from that vessel to the next stage of the process.

The extreme conditions encountered by the refractory lining in the area of the tuyere pipes causes the refractories and the pipe lining to wear back at a rate exceeding the wear in other parts of the vessel. Such wear differentials may be exaggerated further in anode refining vessels and/or convertors due to the emptying of the vessel of completed charges and the filling of the vessel of charges to be treated. This creates wide temperature fluctuations at the tuyere line since it is necessary to blow relatively cold gases through them to keep the liquid charge from blocking them. Such temperature fluctuations can accelerate the wear of the refractory through thermal shock caused by the temperature fluctuations.

As previously stated, these and other forces cause the refractories to wear at an accelerated rate as compared to other parts of the vessel. When the tuyere area is worn to a thickness considered unsafe for further use, it is common to cool down the vessel, remove the worn area and replace it.

Such large furnaces with refractory linings usually from 12" to 24" thick take several days to cool down to ambient temperatures from their working temperatures. In addition, then the repair must be made and the vessel must be reheated over two or three days to prevent damage to the refractory lining by too rapid heating. In addition, the rest of the lining which is still acceptable for use is damaged by the thermal shock of cooling it down and reheating it, thus shortening its life.

Accordingly, it is very advantageous to be able to repair refractories in the tuyere area while the vessel is still hot. However, the most common practice is to run the vessel until the tuyere line has reached the limits of its life and then cool the vessel down to ambient temperatures to repair it.

One of the difficulties encountered in repairing the tuyere area is that when the refractory lining wears the tuyere pipe wears back also. It is time consuming and expensive to replace the tuyere pipe and if it is not replaced, the repair refractories are subjected to direct contact with the gas stream, unprotected by the tuyere pipe. In addition, each tuyere is rammed open with a rod between each charge to ensure that the charge has not blocked the tuyere. This subjects the surrounding unprotected repair refractories to such stresses that most copper or nickel producers would expect the refractories to fail too quickly to substantially extend the life of the tuyere line refractories.

Hot repairs have been attempted in the past by gunning wet refractories into the tuyere line area and using a pipe or rod inserted inside the tuyere pipe to prevent the gunning material blocking the tuyere pipe hole. This method is generally considered ineffective as a repair method to substantially extend the life of tuyere line refractories for the reasons outlined in the preceding paragraph.

SUMMARY OF THE INVENTION

Most nickel or copper producers would not expect to materially alter the life of tuyere line refractories by depositing refractory unprotected by the tuyere pipe.

According to the present invention, there is provided a method of adding to the tuyere line refractories in a working environment at temperatures in excess of 800° F. whereby refractory repair material is deposited into position by utilizing a ceramic welding process whereby particles of refractories are projected in a hot atmosphere through a lance or multiple lances together with a combustible source, a stream of oxygen and other gases and burning the mixture during its projection to form a coherent refractory mass bonded to the refractories to be repaired.

This invention incorporates insertion of a steel pipe or rod through the tuyere pipes and projecting beyond the end of the tuyere pipes inside the vessel. Such pipes or rods are deliberately sized in diameter so that while they may be inserted and removed with relative ease, they fill as much of the interior area of the pipe as possible. This minimizes formation of a shelf or step in the refractories at the inner end of the tuyere pipes such that the ram used to clean the tuyere pipes between each charge does not materially damage the refractory repair material. The length of the filler pipe or rod is sized to allow the appropriate repair material to be deposited.

Once the filler pipes or rods have been inserted into the tuyere pipes in the refractories to be repaired the repair material is flame sprayed onto the refractories.

The pipes or rods are then removed and the vessel returned to production. The pipes or rods can be a pipe of schedule 40 or better thickness. The refractory material when deposited around them will not adhere.

Due to the quality of the refractory applied by flame spraying a particle stream of a refractory material and an oxidizable material in a carrier gas aspirated by a high pressure stream of oxygen in a flame spraying apparatus as disclosed in U.S. patent application No. 07/255,634, only a small amount of the refractory is worn off during each use of the vessel. In addition, over a period of time of two to fifteen uses or charges, a cone wear pattern forms around the unprotected refractories with the widest part of the cone against the inside face.

By repeatedly inserting the pipe or rods and filling the coned and worn area with the ceramic weld material it is possible to retard, suspend the tuyere line refractory wear and even build and strengthen the tuyere line refractories, thus substantially increasing the life of the tuyere line area refractories.

This repetitive repair process requires a relatively small quantity of flame sprayed material hence rendering the process economic to nickel and copper producers.

This process reduces the frequency of tuyere line repairs required to keep the vessel operating, thus substantially increasing production time available.

The process can eliminate the need to deposit a magnetite lining over the refractories inside a vessel to extend the tuyere line life, thus substantially increasing production time since this magnetite lining application can take four to six hours once or twice per week to maintain.

This process can allow copper and/or nickel producers to push the production vessel to higher production levels, a practice which increases production at the cost of tuyere line refractory wear. They can then rebuild or maintain the tuyere line using this process.

BRIEF DESCRIPTION OF THE DRAWINGS

Some preferred outlines of the invention will be described by example and with reference to the accompanying drawings, as follows.

DESCRIPTION OF THE DRAWINGS

Figure 1:
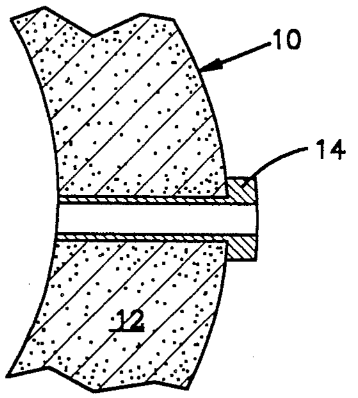
FIGS. 1 to 3 are respectively cross sections of a refractory lining through a tuyere pipe.
Figure 2:
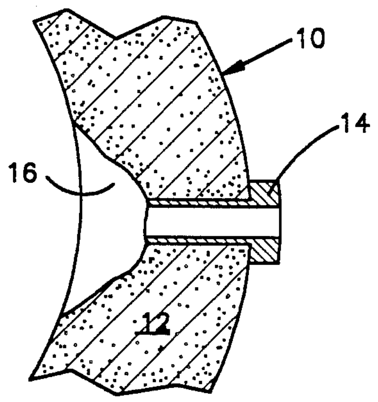
Figure 3:
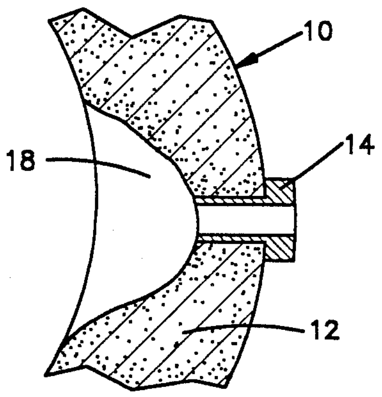

In FIGS. 1 to 3 of the drawings, a partial cross section of a vessel 10 shows a refractory area 12 through which a tuyere pipe 14 extends. FIG. 1 shows the refractory area 12 and tuyere pipe 14 when new and before first use. FIG. 2 shows the refractory area and tuyere pipe when partially used where the wear pattern is relatively a gentle depression 16. FIG. 3 shows the refractory area and tuyere pipe when partially used where the wear pattern is relatively a sharp depression 18. The repair is conducted when the tuyere area refractories are greater than three inches thickness and less than sixteen inches thickness.

Figure 4:
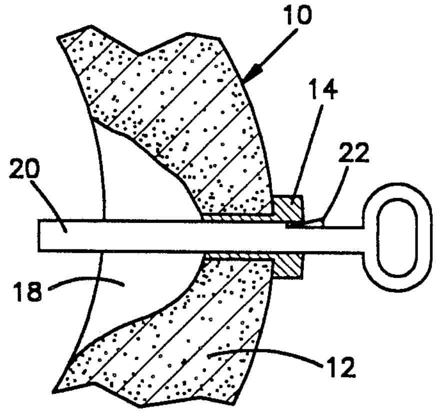
FIGS. 4 to 6 illustrate a cross section being repaired in accordance with the invention.

In FIG. 4 a pipe or rod 20 is shown inserted into the worn tuyere pipe 14 and held in place by a wedge 22 to prevent it falling out when the vessel is moved and the repair refractory powder is flame sprayed around the pipe to fill all of the wear depression.

Figure 5:
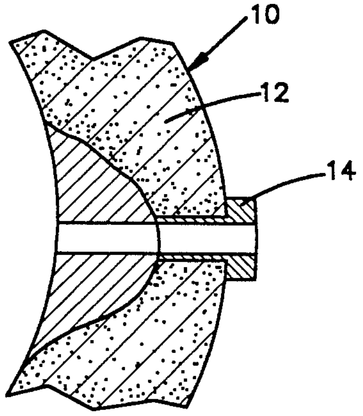

In FIG. 5 the pipe or rod 20 has been removed and the vessel is ready to be returned to service.

Figure 6:
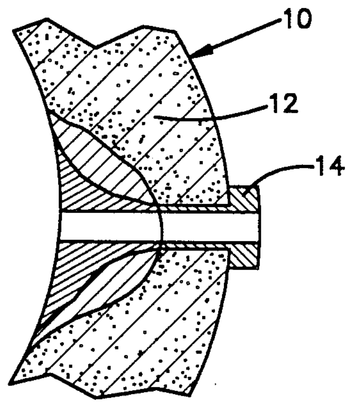

FIG. 6 shows the conical wear pattern which thereafter develops with use. This wear area is repaired by installing the pipe or rod as in FIG. 4 and flame spraying repair refractory into the conical area to restore the material configuration of repair.

By this means the wear of the tuyere line can be controlled to balance out the life of the tuyere line refractories with the rest of the vessel refractories.

EXAMPLE 1 OF THE PREFERRED INVENTION

A copper produced used a convertor with approximately 35 tuyeres until the refractories in the tuyere are worn from an average 18" thickness to an average of 9" thickness of remaining refractory.

At this stage a solid rod was installed. The rod tapered $\frac{1}{8}$" to $\frac{1}{4}$" from the outside of the convertor to the inside to facilitate easy insertion and removal of the rod. A "T" Bar or Ring was welded onto the outside end of the rod again to facilitate easy removal of the rod.

Material according to the invention described in U.S. application Ser. No. 07/255,634 dated Oct. 11, 1988 was then flame sprayed onto the refractories around the solid bar to an average depth of four to six inches. This material was an oxygen-carrier gas-oxidizable material-refractory material stream formed in the flame spraying apparatus. About 2,000 pounds of material was applied. The rod was removed and the vessel returned to service.

Consecutively after every three to nine uses/charges, the solid bars were reinstalled and the flame spraying material of the oxygen-carrier gas-oxidizable material-refractory material stream according to the invention described in U.S. application Ser. No. 07/255,634 dated Oct. 11, 1988 was then flame sprayed into the coned area back to the initial application configuration. Each application consumed 720 to 1,500 pounds of material depending on the number of charges and method of operation of the vessel.

After six weeks of operation, the average tuyere measurement of the vessel (wall thickness of the vessel at the tuyere) before repair was eleven inches, or two inches thicker than six weeks earlier even though the vessel had produced fully during the six weeks.

EXAMPLE 2 OF THE PREFERRED INVENTION

A copper producer used a convertor with approximately 50 tuyeres until the refractories had worn so thin in the tuyere area the producer discontinued use of the vessel as a convertor. He had produced approximately 5,000 tons of blister copper from this vessel.

At this stage pipes were installed into the tuyeres and the tuyere line refractories built up as in Example 1. However, due to the severity of the damage, the tuyere line was built thicker and thicker over the first three successive applications consuming about 8,000 pounds of repair material. The tuyere line was then stabilized at or around that built up thickness during subsequent repairs by successive applications of the repair material, consuming an average of approximately 1,000 to 2,000 pounds on each repair depending on number of charges and severity of operation.

The vessel was finally removed from production having produced 18,000 tons of blister copper. The reason for removal was excessive wear to other parts of the vessel and in particular the mouth of the vessel where charging and discharging took place and not due to the tuyere line refractories.

The oxygen-carrier gas-oxidizable material-refractory material stream being flame sprayed in the above described method for repairing a refractory vessel having a worn area about the tuyere will now be described with respect to the invention of U.S. application Ser. No. 07/255,634, dated Oct. 11, 1988. A method and apparatus for flame spraying refractory material for in situ repair is disclosed. In the flame spraying apparatus a mixture of carrier gas and entrained particles of an oxidizable material and an incombustible refractory material is aspirated by means of a high pressure stream of oxygen, and the oxygen-carrier gas-oxidizable material-refractory material stream is formed by the mixing of the oxygen stream with the particle stream in a restriction in the flame spraying apparatus. When the oxygen-carrier gas-oxidizable material-refractory material stream is projected from the flame spraying apparatus toward the removable pipe and area being repaired, the oxidizable material burns, and the refractory material is melted and sintered thereby forming a coherent refractory mass where it is deposited.

The use of finely divided oxidizable powders in an aggregate amount of 8–12% is sufficient to create a high quality refractory mass with regard to mass chemistry, density and porosity when using this process to create magnesium oxide/chromium oxide/aluminum oxide refractory matrices. Such powders preferably consist of one or more of chromium, aluminum, zirconium, and/or magnesium metals; such powders produce magnesia/chromite, alumina/chromite, magnesite/alumina, and zirconia/chromite bond matrixes and/or any combination thereof. Such bond matrices will improve wear resistance in high temperature environments over silica type bonds produced by using less reactive silicon powder used by the prior art as part or all of the oxidizing materials.

Silicon powder can be used to add controlled percentages of silica to the final chemical analysis, thus allowing for a full spectrum of control over final chemical analysis. Such additions could substantially increase the total percentage of oxidizable powders since silicon provides relatively less heat reaction than more reactive oxidizable powders such as aluminum or chromium or magnesium or zirconium. A typical substitution would be 2% of silicon for every one percent of other powder. Such substitution could be expected to add silica to the final refractory mass analysis. The use of finely divided oxidizable powders in an aggregate amount of 15–25% is sufficient to create a high quality refractory mass with regard to mass chemistry, density and porosity when using this process to create silicon carbide base refractories. Coke powder, Kerosene or propane are another source of fuel to generate the heat of reaction to melt or sinter the refractory particles to each other and to the refractories to be repaired.

The preferred particle size of the oxidizable materials is below about 60 microns; the more preferred particle size is below about 40 microns and the most preferred particle size is below about 20 microns. Smaller particle sizes increase the rate of reaction and evolution of heat to result in more cohesive refractory masses being deposited.

The very fine particles of oxidizable material are substantially consumed in the exothermic reaction which takes place when the oxygen-carrier gas-oxidizable material-refractory material stream exits the lance of the flame spraying apparatus. Any residue of the stream would be in the form of the oxide of the substances therein or in the form of a spinel created by the chemical combination of the various oxides created. In general the coarser the oxidizable particle, the greater the propensity for it to create the oxide rather than to be fully consumed in the heat of reaction. This is an expensive method of producing oxide, however, and it is preferred generally to use the very fine oxidizing particles as disclosed above and to achieve the desired chemistry by deliberate addition of the appropriate refractory oxide.

The use of chromic oxide as part of the chemistry of refractory masses used in high temperature conditions has long been recognized as a valuable addition to reduce thermal shock or spalling tendencies and enhance wear and erosion resistance characteristics. Chromium oxide occurs naturally in various parts of the world; although it is heat treated in various ways, such as by fuzing, it contains by-products which are difficult or expensive to eliminate. One particular source has a high proportion of iron oxide as a contaminant. This material has proved to impart particularly good wear characteristics to refractory masses in certain applications.

Another material is produced by crushing refuzed grain brick such as was produced by Cohart. Some are known commercially as Cohart RFG or Cohart 104 Grades. Again some of these materials typically contain 18–22% of $Cr_2O_3$ and 6–13% of iron oxide. When using these materials in the presence of pure oxygen, violent backflashes occur. When diluted with an inert carrier before oxygen is added, however, backflashes are eliminated or reduced to a non-dangerous, non-violent level.

The ratio of carrier gas to oxygen has an important effect on the ability to create the correct conditions for the exothermic reaction. Too much air will dampen or cool the reaction resulting in high porosity of the formed mass and hence reduce wear characteristics of the mass. In addition, it will substantially increase the rebound percentage and hence increasing the cost of the mass. It can make the exothermic reaction difficult to sustain. It has been found that a spraying machine conveying the particles using air as the aspirant most preferably operates at 5–15 psi air, conveying the particles to the flame spraying apparatus using oxygen as the aspirant, preferably at 50–150 psi oxygen. In this case the same size nozzles for air and oxygen give an average most preferred dilution volume ratio of 10 to 1 oxygen to air. Dilution ratio as low as 5 to 1 oxygen to air and as high as about 30 to 1 oxygen to air can be effective although at 30 to 1, one can begin to experience backflashes with particularly active materials such as iron oxide or chromium metal. The most ideal operating pressures are 8–12 psi air and 80 –120 psi oxygen and as close as possible to 10 to 1 operating pressures, i.e., 8 psi air to 80 psi oxygen, and 12 psi air to 120 psi oxygen. Also the oxygen-carrier gas pressure ratio can preferably be about 8 to 1 to about 12 to 1.

By adjusting the oxidizing/refractory oxide ratio to compensate for the melting point changes of the different refractory oxides, it is possible to create refractory masses of almost any chemical analysis. It has been found that when flame spraying $MgO/Cr_2O_3/Al_2O_3$ materials, oxidant mixtures of one or more of aluminum/chromium and/or magnesium allow accurate chemical analysis reproduction, low rebound levels (material loss) and high quality refractory mass production with regard to density and porosity. The most ideal percentage by weight of oxidizing material is this type of mass was 8 ½–10 ½%.

The refractory oxide materials used can vary over a wide range of mesh gradings and still produce an acceptable refractory mass. High quality masses are obtained using refractory grains screened −10 to dust USS and containing as low as 2% −200 mesh USS. Other high quality masses are formed using refractory grains sized −100 to dust USS and containing over 50% −200 USS. In general, refractory mass build up is faster when coarser particles are used. Excessive percentages of coarse material can cause material settling in the feed hose and lower rates of refractory mass formation.

A major benefit of this invention is that refractory masses have been formed at rates of over 2,000 lbs. per hour. By increasing the feed rate of the carrier gas/particle mixture and increasing the size of the venturi and/or lance, it is projected that feed rates of 6,000 lbs. per hour and up can be achieved. It is important to maintain the oxygen/carrier gas ratio of between 5−1 oxygen/carrier gas and 30−1 oxygen/carrier gas in this scale up.

While a preferred embodiment and examples of the convertor have been described in detail, it will be appreciated that modifications and alterations can be made therein without departure from the spirit and scope of the invention set forth in the appended claims.

What is claimed is:

1. A method of repairing a refractory vessel having a tuyere that includes a pipe surrounded by refractory and in which the discharge end of the pipe and immediately surrounding refractory area has been worn away, the steps comprising:

(a) maintaining the vessel at a temperature in excess of 800° F.

(b) providing a mixture of particles of a refractory material and an oxidizable material, and a carrier gas to a flame spraying apparatus;

(c) placing a removable pipe or rod in the tuyere and extending it beyond the tuyere to which pipe or rod the refractory material when deposited around it will not adhere;

(d) projecting an oxygen-carrier gas oxidizable material-refractory material stream formed in flame spraying apparatus toward the removable pipe or rod and the refractory area to be repaired;

(e) burning the oxidizable material;

(f) melting and sintering the refractory material;

(g) depositing the melted refractory material to form a coherent refractory mass around the removable pipe or rod and on the immediately surrounding refractory area; and, (h) removing the pipe or rod from the vessel leaving the coherent refractory mass in the vessel, with a refractory hole formed at the inner end of the tuyere aligned with the pipe of the tuyere, which mass is unprotected by a pipe along the inside of the hole.

2. A method according to claim 1 where the repair is conducted when the tuyere area refractories are greater than three inches thick and less than sixteen inches thick.

3. A method according to claim 1 where the repair is repeated after the second use of the vessel after repair and before the fifteenth use of the vessel after repair.

4. A method according to claim 1 where the refractory material is deposited by:

(a) forming a particle stream of the carrier gas and the mixture of particles of the oxidizable material and the refractory material;

(b) delivering a high pressure stream of oxygen to the flame spraying apparatus;

(c) aspirating into the flame spraying apparatus by means of the high pressure stream of oxygen the particle stream; and (d) mixing the particle stream with the high pressure oxygen stream in a restriction in the flame spraying apparatus to form an oxygen-carrier gas oxidizable material-refractory material stream wherein the proportion of oxygen to carrier gas is from 5 to 1 to about 30 to 1 and so that the oxygen-carrier gas oxidizable material-refractory material stream has a greater velocity than the particle stream.

5. A method according to claim 1 where the projecting step utilizes exothermically oxidizable material as a source of fuel to generate heat of reaction to melt and sinter the particle of the refractory material to each other and to the refractory area being repaired, said oxidizable material having an average grain size of less than 60 microns.

6. A method according to claim 1 where the projecting step uses coke powder, kerosene or propane as oxidizable material to generate the heat of reaction to melt and sinter particles of refractory material to each other and to the refractory area being repaired.

7. A method according to claim 1 where the holes in the refractory repair mass and prevent the weld material mass from blocking the tuyere pipe, a solid rod is placed, wherein the removable pipe or rod is steel and reusable.

8. A method according to claim 7 where the removable pipe or solid rod is tapered $\frac{1}{8}$" to $\frac{1}{4}$" to assist in each insertion into the tuyere and removal from the tuyere.

9. A method according to claim 7 where the removable pipe or rod has "T" or ring or other shape fixed to the back of it to prevent it from going into the vessel and to facilitate ease of insertion and ease of removal after the repair.

10. A method according to claim 7 where the pipe or rod is a pipe of schedule 40 or better in thickness.

11. A method according to claim 1 where the melted refractory material is deposited by aspirating into a flame spraying apparatus by means of a high pressure stream of oxygen, a mixture comprising carrier gas and entrained particles of an oxidizable material and of an incombustible refractory material to form an oxygen-carrier gas-oxidizable material-refractory material stream, the refractory material comprising one or more of magnesium oxide, chromium oxide and aluminum oxide, the oxidizable material comprising one or more of chromium, aluminum and magnesium and being present in an amount comprising about 8 to 12% by weight of the particles in the mixture, and the oxygen-carrier gas pressure ratio being about 8 to 1 to about 12 to 1.

12. A method of repairing a refractory vessel in which the vessel wall has a recess surrounding a tuyere opening, by adding refractory mass to the recess while the vessel is maintained at a temperature in excess of 800° F., the steps comprising:

(a) inserting a pipe or rod to which a refractory material when deposited around it will not adhere into a tuyere from the outside of the vessel and extending it inward substantially beyond the end of the tuyere;

(b) delivering though an outlet nozzle a high pressure stream of oxygen to a flame spraying apparatus, the high pressure stream of oxygen having a pressure of 50 psi to 150 psi;

(c) aspirating into the flame spraying apparatus by means of the high pressure stream of oxygen a mixture comprising carrier gas and entrained particles of an oxidizable material and of a refractory material in an amount to achieve a volume ratio of from 5 to 1 to about 30 to 1 oxygen to carrier gas, the oxidizable material comprising one or more of chromium, aluminum, zirconium, silicon and magnesium and being present in an amount comprising about 8 to 12% by weight of the materials in the mixture, the refractory material comprising one or more of magnesium oxide, zirconium oxide, iron oxide, chromium oxide, aluminum oxide and silicon carbide, the carrier gas having a pressure of 5 psi to 150 psi, to form an oxygen-carrier gas oxidizable material-refractory material stream;

(d) mixing the oxygen gas and the carrier gas and entrained particles of the oxidizable material and of the refractory material in a restriction slightly downstream of the oxygen outlet nozzle and upstream from an outlet nozzle of the flame spraying apparatus;

(e) projecting the oxygen-carrier gas oxidizable material-refractory material stream from the outlet nozzle of the flame spraying apparatus toward the recess in the refractory vessel at a worn tuyere area;

(f) burning the oxidizable particles;

(g) depositing a coherent refractor mass of the projected stream in the recess and bout the pipe or rod, and thereafter;

(h) withdrawing the pipe or rod; and (i) leaving an area of coherent refractory mass in the vessel in which is formed a refractory hole at the inner end of the tuyere and which is unprotected along the inside of the hole.

13. A method of repairing a refractory vessel having a tuyere that includes a pipe surrounded by refractory and in which the discharge end of the pipe and the immediately surrounding refractory has been worn away, the steps comprising:

(a) maintaining the vessel at a temperature in excess of 800° F.

(b) providing a mixture of particles of a refractory material and an oxidizable material and a carrier gas for availability to a flame spraying apparatus wherein the oxidizable material comprises one or more of chromium, aluminum, magnesium, zirconium and silicon and comprising an amount of from 8% to 12% by weight of the particles in the mixture; and wherein the refractory material comprises one or more of chromium oxide, aluminum oxide, zirconium oxide, silicon oxide, magnesium oxide, iron oxide and silicon carbide;

(c) placing a removable pipe or rod in a tuyere and extending it beyond the tuyere to which the removable pipe or rod refractory material when deposited around it will not adhere;

(d) delivering the mixture of a carrier gas and the oxidizable material and the refractory material into an oxygen gas stream in the flame spraying apparatus forming an oxygen-carrier gas-oxidizable material-refractory material stream, the oxygen gas being at a substantially higher pressure than the carrier gas, and delivered in an amount to achieve a volume ratio from 5 to 1 to about 30 to 1 oxygen gas to carrier gas;

(e) projecting the oxygen-carrier gas-oxidizable material-refractory material stream from the flame spraying apparatus toward the removable pipe or rod and the surrounding refractory area to be repaired;

(f) burning the oxidizable material;

(g) melting and sintering the refractory material;

(h) depositing the melted refractory material to form a coherent refractory mass on the refractory area and around the pipe or rod; and, (i) removing the pipe or rod from the vessel leaving the coherent refractory mass in the vessel with a refractory hole formed at the inner end of the tuyere aligned with the pipe of the tuyere, which mass is unprotected by a pipe along the inside of the hole.

* * * * *

UNITED STATES PATENT AND TRADEMARK OFFICE
CERTIFICATE OF CORRECTION

PATENT NO. : 4,981,628

DATED : January 1, 1991

INVENTOR(S) : David C. Willard

It is certified that error appears in the above-identified patent and that said Letters Patent is hereby corrected as shown below:

Column 2, line 38, before "most" insert --The present invention is based on the fact--.

Column 4, line 7, delete "line" and insert --lined--.

Column 4, line 11, delete "produced" and insert --producer--.

Column 8, line 21, delete "particle" and insert --particles--.

Column 8, line 30, Claim 7, "where the holes in the refactory repair mass and prevent the weld material mass from blocking the tuyere pipe, a solid rod is placed," should be deleted.

Column 9, line 36, delete "bout" and insert --about--.

Signed and Sealed this

Third Day of March, 1992

*Attest:*

HARRY F. MANBECK, JR.

*Attesting Officer*

*Commissioner of Patents and Trademarks*